(12) United States Patent
Agarwal et al.

(10) Patent No.: US 11,734,737 B2
(45) Date of Patent: Aug. 22, 2023

(54) SYSTEMS AND METHODS FOR THE SALE OF AGE-RESTRICTED MERCHANDISE

(71) Applicant: Walmart Apollo, LLC, Bentonville, AR (US)

(72) Inventors: Nidhi Agarwal, Bangalore (IN); Anika Setia, Bangalore (IN); Sakshi Jain, Bangalore (IN)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/574,279

(22) Filed: Sep. 18, 2019

(65) Prior Publication Data

US 2020/0098023 A1  Mar. 26, 2020

Related U.S. Application Data (60) Provisional application No. 62/767,700, filed on Nov. 15, 2018.

(30) Foreign Application Priority Data

Sep. 20, 2018 (IN) .............................. 201841035489

(51) Int. Cl.
*G06Q 30/06* (2023.01)
*G06Q 30/0601* (2023.01)
(Continued)

(52) U.S. Cl.
CPC ..... *G06Q 30/0607* (2013.01); *G06Q 20/3223* (2013.01); *G06Q 20/3227* (2013.01); *G06Q 20/40145* (2013.01)

(58) Field of Classification Search
CPC ........ G06Q 20/20; G06Q 20/00; G06Q 20/40; G06Q 30/00; G06Q 20/10; G06Q 20/32;
(Continued)

(56) References Cited

U.S. PATENT DOCUMENTS 6,522,772 B1 * 2/2003 Morrison ................. G07G 1/12
  235/383
7,512,567 B2 * 3/2009 Bemmel .............. G06Q 20/204
  705/64
(Continued)

FOREIGN PATENT DOCUMENTS

WO  2015150917     10/2015
WO  2017065735 A1   4/2017
(Continued)

OTHER PUBLICATIONS

PCT; App. No. PCT/US19/50789; International Search Report and Written Opinion dated Nov. 27, 2019.
(Continued)

*Primary Examiner* — Olusegun Goyea
(74) *Attorney, Agent, or Firm* — Fitch, Even, Tabin & Flannery LLP (57) ABSTRACT

There are provided systems and methods for the purchase of age-restricted merchandise without requiring the transmission of biometric information. In one form, the system includes: age-restricted merchandise items offered for sale to customers, a server that receives orders from customer devices, and a customer database containing a plurality of customer records. The system further includes: a control circuit that queries a customer whether the customer opts in to the use of local biometric authentication to enable the purchase of age-restricted merchandise items; receives customer identification proof documentation; associates a unique identifier corresponding to the customer device; stores the customer's opt in agreement, the customer's identification proof documentation, and the unique identifier associated with the customer device; receives an order for the purchase of an age-restricted merchandise item and the unique identifier; confirms local biometric authentication;
(Continued)

verifies the customer's identity and age; and authorizes completion of the purchase transaction.

23 Claims, 5 Drawing Sheets (51) Int. Cl.
  *G06Q 20/32* (2012.01)
  *G06Q 20/40* (2012.01)
(58) Field of Classification Search
  CPC .... G06Q 30/06; G06Q 99/00; G06Q 20/3674; G06Q 30/04; G06Q 20/341; G06F 17/30; G06F 7/00; G06F 21/00; G06F 21/62; G06F 21/32
  USPC ..... 705/64, 44, 35, 39, 67, 75, 30, 41, 26.1, 705/26.25; 235/382, 380, 379, 383; 455/405, 418; 726/6, 9; 340/5.83
  See application file for complete search history.

(56) References Cited

U.S. PATENT DOCUMENTS

| | | | | |
|---|---|---|---|---|
| 7,769,638 | B1* | 8/2010 | Mollett | G06Q 20/20 705/26.1 |
| 7,931,194 | B2* | 4/2011 | Keys | G07F 9/026 235/382 |
| 8,355,992 | B1* | 1/2013 | Haugh | G06Q 20/20 705/64 |
| 8,473,351 | B1 | 6/2013 | Mollett | |
| 8,880,434 | B2 | 11/2014 | Bemmel | |
| 9,189,788 | B1* | 11/2015 | Robinson | G06Q 20/40145 |
| 9,195,815 | B2 | 11/2015 | Choong | |
| 9,466,082 | B1 | 10/2016 | Dabiri | |
| 9,665,896 | B2 | 5/2017 | Atikoglu | |
| 9,881,328 | B2 | 1/2018 | Atikoglu | |
| 11,334,931 | B2 | 5/2022 | Ryner | |
| 2002/0087413 | A1 | 7/2002 | Mahaffy | |
| 2003/0018522 | A1 | 1/2003 | Denimarck | |
| 2003/0177102 | A1* | 9/2003 | Robinson | G07F 9/026 705/75 |
| 2004/0044627 | A1* | 3/2004 | Russell | G06Q 20/4014 705/50 |
| 2004/0133477 | A1* | 7/2004 | Morris | G06Q 30/0603 348/E7.086 |
| 2004/0153421 | A1* | 8/2004 | Robinson | G06Q 20/20 705/75 |
| 2005/0137987 | A1 | 6/2005 | May | |
| 2006/0277148 | A1* | 12/2006 | Thackston | G06Q 20/28 705/41 |
| 2007/0119923 | A1* | 5/2007 | Garrison | G06Q 20/4014 235/380 |
| 2007/0129056 | A1* | 6/2007 | Cheng | H04L 51/212 455/418 |
| 2007/0168290 | A1 | 7/2007 | Robinson | |
| 2008/0046366 | A1 | 2/2008 | Bemmel | |
| 2008/0073430 | A1 | 3/2008 | Sickenius | |
| 2008/0275748 | A1* | 11/2008 | John | G06Q 20/382 705/26.1 |
| 2008/0319872 | A1 | 12/2008 | Russell | |
| 2009/0063312 | A1* | 3/2009 | Hurst | G06Q 20/40 705/41 |
| 2009/0064302 | A1* | 3/2009 | Colella | G06Q 20/3674 726/9 |
| 2009/0066478 | A1* | 3/2009 | Colella | G06Q 30/04 340/5.83 |
| 2009/0152343 | A1 | 6/2009 | Carter | |
| 2009/0321515 | A1 | 12/2009 | Turner | |
| 2010/0234987 | A1* | 9/2010 | Benschop | G07F 7/025 340/5.81 |
| 2011/0072039 | A1* | 3/2011 | Tayloe | G06F 21/62 707/769 |
| 2011/0145147 | A1* | 6/2011 | Wylie | G06Q 20/40 707/812 |
| 2012/0028612 | A1* | 2/2012 | Hurst | G06Q 20/40 455/411 |
| 2012/0030044 | A1* | 2/2012 | Hurst | G06Q 20/326 705/16 |
| 2013/0007849 | A1* | 1/2013 | Coulter | G06F 21/35 726/4 |
| 2013/0048720 | A1* | 2/2013 | Lewis | G07C 9/253 235/382 |
| 2013/0073432 | A1* | 3/2013 | Mulholland | G06Q 20/12 705/26.61 |
| 2013/0073460 | A1* | 3/2013 | Paquin | G06F 21/6263 705/44 |
| 2013/0112746 | A1 | 5/2013 | Krell | |
| 2013/0179336 | A1* | 7/2013 | Lyons | G06Q 20/3276 705/39 |
| 2013/0201000 | A1* | 8/2013 | Solomon | G07C 9/29 340/5.83 |
| 2013/0204786 | A1* | 8/2013 | Mattes | G06Q 20/40145 705/44 |
| 2013/0326613 | A1 | 12/2013 | Kochanski | |
| 2014/0201100 | A1* | 7/2014 | Rellas | G06Q 30/0607 705/330 |
| 2014/0244514 | A1 | 8/2014 | Rodriguez | |
| 2014/0282945 | A1* | 9/2014 | Smith | H04L 63/0861 726/6 |
| 2015/0106296 | A1* | 4/2015 | Robinson | G06Q 10/0838 705/339 |
| 2015/0120559 | A1* | 4/2015 | Fisher | G06Q 20/3224 705/44 |
| 2015/0227995 | A1* | 8/2015 | Takahashi | G06Q 30/0607 705/26.25 |
| 2016/0086418 | A1 | 3/2016 | Smolen | |
| 2016/0210633 | A1 | 7/2016 | Epelman | |
| 2016/0247135 | A1* | 8/2016 | Miller | G06Q 20/20 |
| 2016/0261411 | A1 | 9/2016 | Yau | |
| 2016/0267561 | A1* | 9/2016 | Atikoglu | G06F 21/32 |
| 2017/0109717 | A1 | 4/2017 | Vafeas | |
| 2017/0228805 | A1 | 8/2017 | Atikoglu | |
| 2017/0345010 | A1 | 11/2017 | Hagihara | |
| 2018/0130118 | A1* | 5/2018 | Guran | G06Q 20/4014 |
| 2018/0181964 | A1* | 6/2018 | Zagarese | G06Q 20/40145 |
| 2019/0050921 | A1 | 2/2019 | Ryner | |
| 2020/0098023 | A1 | 3/2020 | Agarwal | |
| 2022/0245690 | A1 | 8/2022 | Ryner | |

FOREIGN PATENT DOCUMENTS

| | | |
|---|---|---|
| WO | 2017066002 | 4/2017 |
| WO | 2019032538 | 2/2019 |
| WO | 2020060835 | 3/2020 |

OTHER PUBLICATIONS

Thakkar, Danny; "Shield Your Privacy and Digital Identity with Fingerprints"; https://www.bayometric.com/shield-privacy-digital-identity/; Believed to be publicly available before priority date of Sep. 20, 2018; pp. 1-3.

Ward, Kelsey; "Biometric vending machines sell marijuana, lead the way on digital identity?"; https://www.secureidnews.com/news-item/biometric-vending-machines-sell-marijuana-lead-the-way-on-digital-identity/; Jul. 24, 2017; pp. 1-3.

USPTO; U.S. Appl. No. 16/057,001; Office Action dated Dec. 2, 2021; (pp. 1-35).

USPTO; U.S. Appl. No. 16/057,001; Notice of Allowance and Fees Due (PTOL-85) dated Jan. 18, 2022; (pp. 1-7).

\* cited by examiner

SYSTEMS AND METHODS FOR THE SALE OF AGE-RESTRICTED MERCHANDISE

CROSS-REFERENCE TO RELATED APPLICATION

This application claims the benefit of Indian Provisional Application No. 201841035489, filed Sep. 20, 2018, and U.S. Provisional Application No. 62/767,700, filed Nov. 15, 2018, which are incorporated by reference in their entirety herein.

TECHNICAL FIELD

This invention relates generally to the sale of merchandise, and more particularly, to the sale of age-restricted merchandise using biometric verification.

BACKGROUND

In the retail setting, merchandise is often sold online and remotely to customers via customer devices. These online sales are becoming increasingly important and tending to displace conventional in-store purchases. Accordingly, it is desirable to make online shopping as easy and convenient to customers as possible.

One type of merchandise sold by retailers is age-restricted merchandise, which involves some sort of age limit on customers seeking to purchase such merchandise. Some examples of age-restricted merchandise include high value merchandise, movies, video games, etc. One approach to confirming the age and/or identity of individuals is the use of biometric readings and verification, such as involve the use of a fingerprint, an IRIS scan, or facial recognition. This approach, however, is difficult in the context of online sales where the transmission of biometric readings may be problematic and even prohibited legally. Thus, it is desirable to develop an approach for the online sale of age-restricted merchandise where biometric verification is performed but without the transmission of biometric readings.

BRIEF DESCRIPTION OF THE DRAWINGS

Disclosed herein are embodiments of systems, apparatuses and methods pertaining to the sale of age-restricted merchandise without requiring the transmission of biometric information. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for the sale of age-restricted merchandise without requiring the transmission of biometric information. In one form, the system comprises: a plurality of age-restricted merchandise items offered for sale to customers, the age-restricted merchandise items each being restricted from purchase by individuals below a predetermined minimum age; a server configured to receive orders for the purchase of merchandise items from customer devices; and a customer database containing a plurality of customer records. The system further comprises a control circuit communicatively coupled to the server and to the customer database, the control circuit configured to: query a customer through the customer device whether the customer agrees to local biometric authentication to enable the purchase of age-restricted merchandise items; receive customer identification proof documentation including age information from the customer device; associate a unique identifier corresponding to the customer device with the customer; store in the customer database the customer's agreement to permit local biometric authentication to enable the purchase of age-restricted merchandise items, the customer's identification proof documentation, and the unique identifier associated with the customer device; receive an order for the purchase of an age-restricted merchandise item requiring a predetermined minimum age from the customer device and receive a unique identifier corresponding to a customer device transmitting the purchase order; receive confirmation that local biometric authentication was performed at the customer device transmitting the purchase order; verify the customer's identity by matching the unique identifier received with the purchase order with the unique identifier for the customer stored in the customer database; verify the customer's age based on the customer's identification proof documentation meets or exceeds the predetermined minimum age required for the age-restricted merchandise item; and authorize completion of the purchase of the age-restricted merchandise item by the customer.

In some implementations, in the system, the unique identifier is a universally unique identifier (UUID) comprising a 128-bit number. In some implementations, the customer device is a smartphone, a tablet, a laptop computer, or a desktop computer. In some implementations, the biometric authentication performed locally at the customer device is fingerprint authentication, iris scan authentication, facial recognition, voice authentication, or palm vein recognition. In some implementations, the system further comprises a software application configured to be downloaded to the customer device. In some implementations, the unique identifier is associated with the software application after download to the customer device. In some implementations, the application is configured to prompt the customer for biometric verification when the customer logs onto the application. In some implementations, the control circuit is further configured to: store the customer's address in the customer's record in the customer database; and transmit instructions for a delivery service to deliver the age-restricted merchandise item ordered by the customer to the customer's address. In some implementations, the control circuit is further configured to: instruct a shopping facility to make the age-restricted merchandise item available for pick up by the customer.

In another form, there is provided a method for the sale of age-restricted merchandise without requiring the transmission of biometric information, the method comprising: providing a plurality of age-restricted merchandise items offered for sale to customers, the age-restricted merchandise items each being restricted from purchase by individuals below a predetermined minimum age; receiving orders for the purchase of merchandise items from customer devices and associating a unique identifier with each customer device; storing a plurality of customer records in a customer database; and by a control circuit: querying a customer through a customer device whether the customer agrees to local biometric authentication to enable the purchase of age-restricted merchandise items; receiving customer identification proof documentation including age information from the customer device; associating a unique identifier corresponding to the customer device with the customer; storing in the customer database the customer's agreement to permit local biometric authentication to enable the purchase of age-restricted merchandise items, the customer's identification proof documentation, and the unique identifier associated with the customer device; receiving an order for the purchase of an age-restricted merchandise item requiring a predetermined minimum age from the customer device and receiving a unique identifier corresponding to a customer device transmitting the purchase order; receiving confirmation that local biometric authentication was performed at the customer device transmitting the purchase order; verifying the customer's identity by matching the unique identifier received with the purchase order with the unique identifier for the customer stored in the customer database; verifying the customer's age based on the customer's identification proof documentation meets or exceeds the predetermined minimum age required for the age-restricted merchandise item; and authorizing completion of the purchase of the age-restricted merchandise item by the customer.

Figure 1:
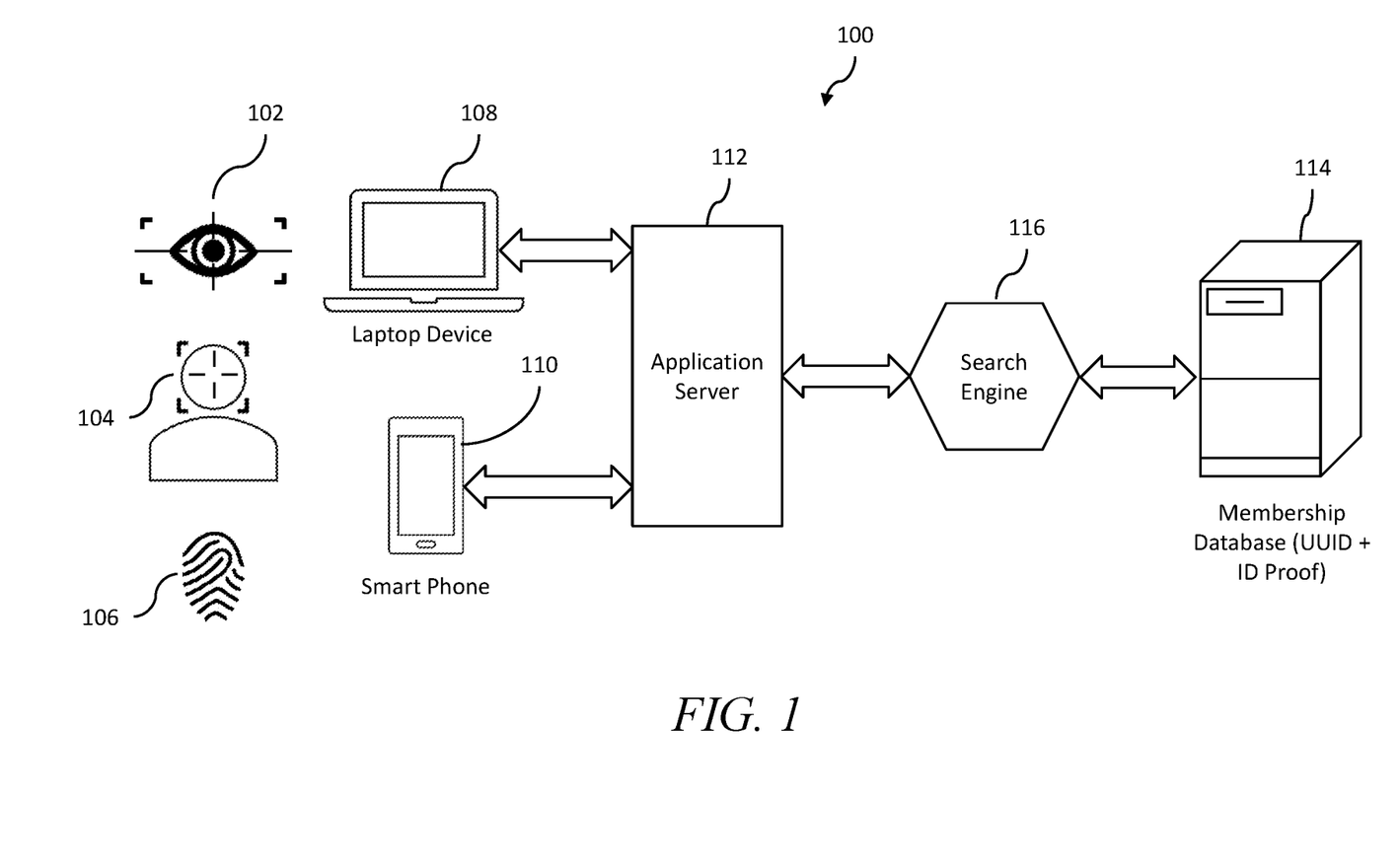
FIG. 1 is a schematic diagram in accordance with some embodiments.

Referring to FIG. 1, there is shown a schematic diagram of a system 100 involving the sale of age-restricted merchandise to customers. In the system 100, it is generally contemplated that a customer desires to make a remote, online purchase of an age-restricted merchandise item. Some examples of age-restricted merchandise potentially include: high value merchandise, movies, video games, aerosol paint, lottery tickets, tobacco products, alcohol products, blades, etc. The specific types of merchandise and specific age restrictions vary depending on the locale.

It is generally contemplated that the customer will initially "opt in" to this approach by providing proof of identification (which includes proof of age). For example, this "opt in" registration by the customer may be performed the first time the customer indicates an intent to make an online purchase of an age-restricted item, such as by putting an age-restricted item in the customer's online shopping cart. Following this initial "opt in" registration, when the customer seeks to purchase age-restricted merchandise, biometric verification may be performed locally at the customer's device without requiring the transmission of biometric readings to a remote database for comparison to previously-stored reference biometric readings.

Biometric readings refer to physical characteristics that are generally unique (or almost unique) to each individual and that may be utilized to authenticate an individual's identity. FIG. 1 shows several examples of some types of local biometric readings that may be used in the system 100. More specifically, FIG. 1 shows biometric readings in the form of IRIS scans 102, facial recognition 104, and/or fingerprints 106. It should be understood, however, that these are just some examples and other biometric readings may be used, such as, for instance, voice authentication, palm vein recognition, etc.

These biometric readings are collected and analyzed at the customer device. Customer devices (or user devices) refer generally to any computing device that a customer (or user) may use to access a retailer website, server, or downloaded software application (app) to make an online purchase transaction. FIG. 1 shows two examples of some customer devices in the form of laptop devices 108 and smartphones 110. It should be understood, however, that these are just two examples and other customer devices may be used, such as, for instance, tablets, desktop computers, etc. Many of these customer devices are equipped with tools that allow the taking and authentication of biometric readings.

As shown in FIG. 1, the customer device (such as a laptop device 108 or smartphone 110) wirelessly communicates with a retailer's server 112. For example, when the customer initiates an online purchase, the customer may use the customer device to access the server 112 via a software app or website. As addressed further below, during registration, the customer device transmits customer identification documentation (identification proof) and a unique identification number to the server 112 where they are stored in a membership (or customer) database 114. When the customer seeks to make a purchase of an age-restricted merchandise item, the unique identification number is transmitted along with confirmation that local biometric verification was successfully performed at the computing device. The local biometric verification may be performed at any of various stages, such as at the time of logging onto the computing device or at the time of making the purchase. A search engine 116 then determines if the transmitted unique identification number matches the one in the membership database 114 for that customer. If so, the purchase transaction is approved.

Figure 2:
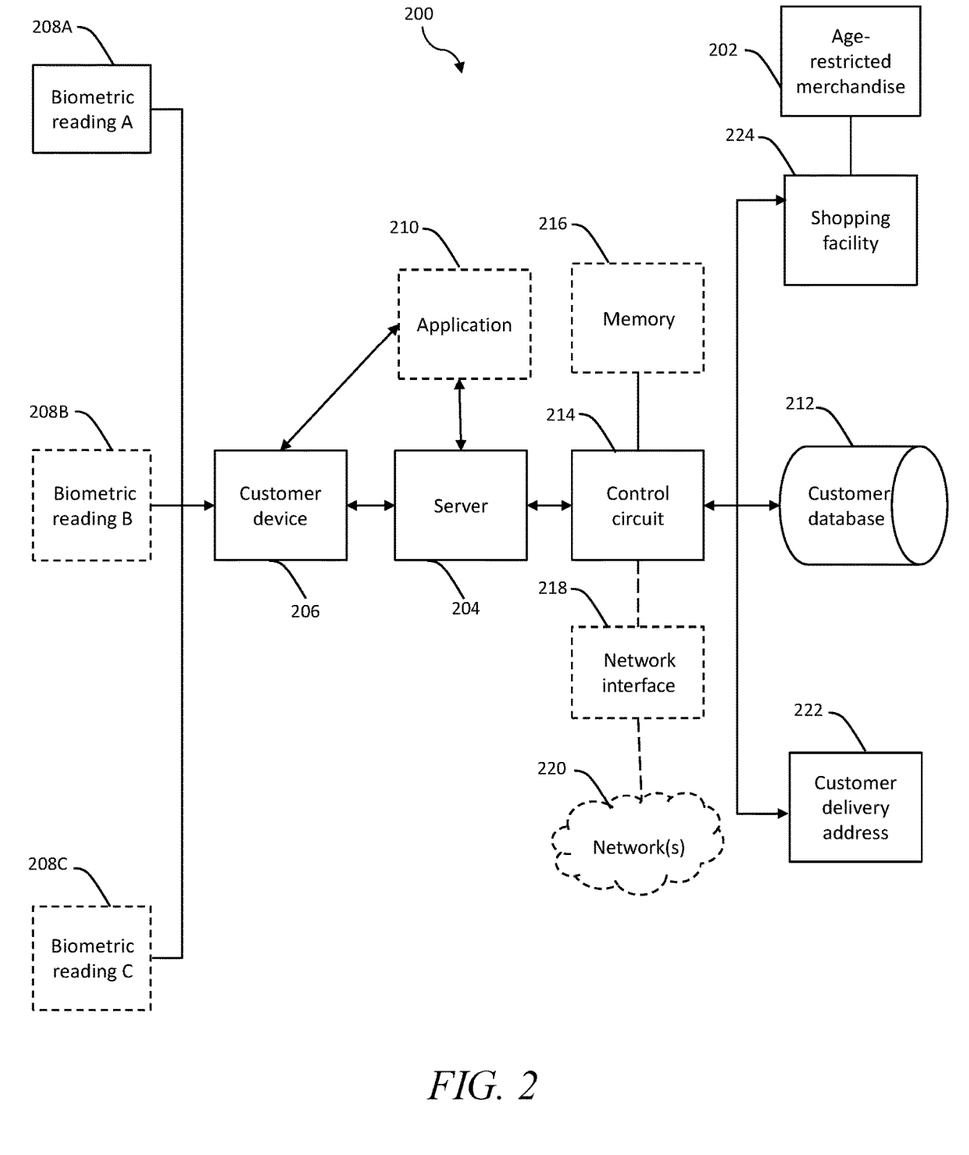
FIG. 2 is a block diagram in accordance with some embodiments.

Referring to FIG. 2, there is shown a system 200 that builds on the overview in the schematic diagram of FIG. 1 and that generally incorporates the components described above. FIG. 2 shows some additional components of the system 200 and their interaction. The system 200 allows for the sale of age-restricted merchandise where biometric verification of age/identity is performed locally at the customer's device and without requiring transmission of the customer's biometric information.

The system 200 includes a plurality of age-restricted merchandise items 202 offered for sale to customers. These age-restricted merchandise items 202 are each restricted from purchase by individuals below a predetermined minimum age. It is generally contemplated that there may be various types of age-restricted merchandise items 202 with the specific types and specific age limits for each merchandise type dependent on the specific state, jurisdiction, or locale. Some example of age-restricted merchandise 202 include: high value merchandise, movies, video games, aerosol paint, lottery tickets, tobacco products, alcohol products, and blades. These age-restricted merchandise items 202 may be made available for sale both online or at shopping facilities or may be sold exclusively online.

The system also includes a server 204 configured to receive orders for the purchase of merchandise items 202 from customer devices 206. In some forms, it is contemplated the server 204 may be associated with a retailer and may correspond to one or more designated online sales locations and/or may correspond to one or more individual stores. Further, as addressed above, the customer device 206 may, for example, be in the form of smartphones, laptops, tablets, desktop computers, or other computing devices that may communicate wirelessly with the server 204.

Further, in one form, the customer device 206 is equipped with tools that enable biometric readings to be performed locally at the device 206. FIG. 2 shows one or more biometric readings (biometric reading A (208A), biometric reading b (208B), and/or biometric reading C (208C)) that may be measured at the customer device 206. As addressed above, biometric readings measure physical characteristics of an individual, and biometric authentication may include, for example, fingerprint authentication, iris scan authentication, facial recognition, voice authentication, or palm vein recognition. The customer device 206 may be equipped with one or more types of biometric measurement tools.

In addition, a unique identifier is associated with each customer's device 206. The identifier may be, in fact, unique or may, at least, be one that is very unlikely to recur. It is generally contemplated that this unique identifier is transmitted to the server 204 following successful local biometric verification/authentication performed at the customer device 206 to authorize the sale of age-restricted merchandise 202. In one form, the unique identifier may be a universally unique identifier (UUID) comprising a 128-bit number. UUIDs are known in the art and require no detailed description herein. Although UUIDs may be used as the unique identifiers, it should be understood that other types of unique identifiers are available and may be used, and this disclosure is not limited to UUIDs.

In one form, it is contemplated that a retailer may provide an app 210 for download by the customer to the customer's device 206 (such as, for example, a mobile app downloaded to a smartphone). This app 210 may facilitate online purchases of merchandise generally via the customer device 206. It is generally contemplated that the unique identifier may be associated with and/or generated by the app 210 (and thereby become associated with the customer device 206). In one form, the unique identifier may be created when the customer (or user) downloads the app to his or her customer device (or user device). Further, in one form, it is contemplated that the app 210 may prompt the device 206 to request biometric verification upon logging onto or opening the app 210. In another form, however, it is contemplated that the app 210 may confirm that biometric verification was previously performed or prompt that verification be performed only when the customer seeks to make an age-restricted purchase with the customer device 206.

It is generally contemplated that it may be preferable to perform the biometric verification only when the customer seeks to actually make the age-restricted purchase. In this form, biometric verification would not occur whenever the customer simply logged onto the customer's mobile device. Requiring biometric verification every time a customer logs onto his or her device may be considered a nuisance by the customer. Further, this approach would limit the likelihood that an unauthorized user might be able to access a customer's device after the customer has logged in but, at a later time, when the device is no longer in the immediate possession of the customer. Accordingly, such an approach would constitute an additional safeguard against unauthorized use.

The system 200 also includes a customer database 212 (or membership database 114) that includes customer records. It is generally contemplated that the customer database 212 may include various types of information provided by the customer, including customer contact information (name, phone number, and email), delivery/billing addresses, etc. As addressed below, it is also contemplated that the customer database 212 may include the customer's "opt in" to using local biometric authentication to enable the purchase of age-restricted merchandise items 202, the customer's identification proof documentation, and the unique identifier associated with the customer device 206 (possibly via app 210).

The system 200 further includes a control circuit 214 that generally controls the operation of the system 200 and that is communicatively coupled to the server 204 and to the customer database 212. Being a "circuit," the control circuit 214 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 214 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 214 is configured (for example, by using corresponding programming as will be well understood by those skilled in the art) to carry out one or more of the steps, actions, and/or functions described herein.

By one optional approach, the control circuit 214 operably couples to a memory 216. This memory 216 may be integral to the control circuit 214 or can be physically discrete (in whole or in part) from the control circuit 214, as desired. This memory 216 can also be local with respect to the control circuit 214 (where, for example, both share a common circuit board, chassis, power supply, and/or housing) or can be partially or wholly remote with respect to the control circuit 214 (where, for example, the memory 216 is physically located in another facility, metropolitan area, or even country as compared to the control circuit 214).

This memory 216 can serve, for example, to non-transitorily store the computer instructions that, when executed by the control circuit 214, cause the control circuit 214 to behave as described herein. As used herein, this reference to "non-transitorily" will be understood to refer to a non-ephemeral state for the stored contents (and hence excludes when the stored contents merely constitute signals or waves), rather than volatility of the storage media itself, and hence includes both non-volatile memory (such as read-only memory (ROM)) as well as volatile memory (such as an erasable programmable read-only memory (EPROM).)

In this example, the control circuit 214 also operably couples to a network interface 218. So configured, the control circuit 214 can communicate with other elements (both within the system 200 and external thereto) via the network interface 218. Network interfaces, including both wireless and non-wireless platforms, are well understood in the art and require no particular elaboration here. This network interface 218 can compatibly communicate via whatever network or networks 220 may be appropriate to suit the particular needs of a given application setting. The control circuit 214 may make use of cloud databases and/or operate in conjunction with a cloud computing platform. Both communication networks and network interfaces are well understood areas of prior art endeavor and therefore no further elaboration will be provided here in those regards for the sake of brevity.

In the system 200, the control circuit 214 is configured to perform a number of operations. The control circuit 214 queries a customer through the customer device 206 whether the customer agrees to local biometric authentication to enable the purchase of age-restricted merchandise items 202, i.e., the customer "opts in." The control circuit 214 receives customer identification proof documentation including age information from the customer device 206. In other words, it is contemplated that, during an initial registration process, the customer provides proof of age/identification. The control circuit 214 associates a unique identifier corresponding to the customer device 206 with the customer. As addressed above, this association may be facilitated by an app 210 downloaded to the customer device 206. The control circuit 214 then stores in the customer database 212 the customer's agreement to permit local biometric authentication to enable the purchase of age-restricted merchandise items, the customer's identification proof documentation, and the unique identifier associated with the customer device 206 (which may be via an app 210).

Following registration, the system 200 receives and processes orders for purchase of age-restricted merchandise 202. The control circuit 214 receives an order for the purchase of an age-restricted merchandise item 202 requiring a predetermined minimum age from the customer device 206 and receives the unique identifier corresponding to the customer device 206 transmitting the purchase order. The control circuit 214 receives confirmation that local biometric authentication was performed at the customer device. As addressed above, it is generally contemplated that biometric authentication may be performed at various stages, such as, without limitation, when logging onto the customer device 206, when logging onto or opening the app 210, or when making a purchase of an age-restricted merchandise item 202. The control circuit 214 verifies the customer's identity by matching the unique identifier received with the purchase order with the unique identifier for the customer stored in the customer database 212. The control circuit 214 verifies the customer's age based on the customer's identification proof documentation meets or exceeds the predetermined minimum age required for the age-restricted merchandise item. For example, the customer's age may be calculated based on a birth date included in the identification documentation. Further, in one form, it is contemplated that this operation may be performed only once (such as when the documentation is initially received) or may be performed multiple times (such as part of each purchase of an age-restricted merchandise item 202). If the unique identifier matches and local biometric authentication is confirmed, the control circuit 214 authorizes completion of the purchase of the age-restricted merchandise item 202 by the customer.

In some forms, following completion of the purchase, the age restricted merchandise item 202 may be delivered to the customer. In one form, for example, the age-restricted merchandise 202 may be delivered to the customer's delivery address 222 (such as a delivery address that may be in the customer's database record). In other words, the control circuit 214 may store the customer's delivery address 222 in the customer's record in the customer database 212 and may transmit instructions for a delivery service to deliver the age-restricted merchandise item 202 ordered by the customer to the customer's address 222. In another form, the age-restricted merchandise 202 may be made available at a shopping facility 224 for pick up by the customer. In other words, the control circuit 214 may instruct a shopping facility 224 to make the age-restricted merchandise item 202 available for pick up by the customer. It should be understood that the customer may be requested to again show proof of identification or age at the time of delivery or pick up.

Figure 3:
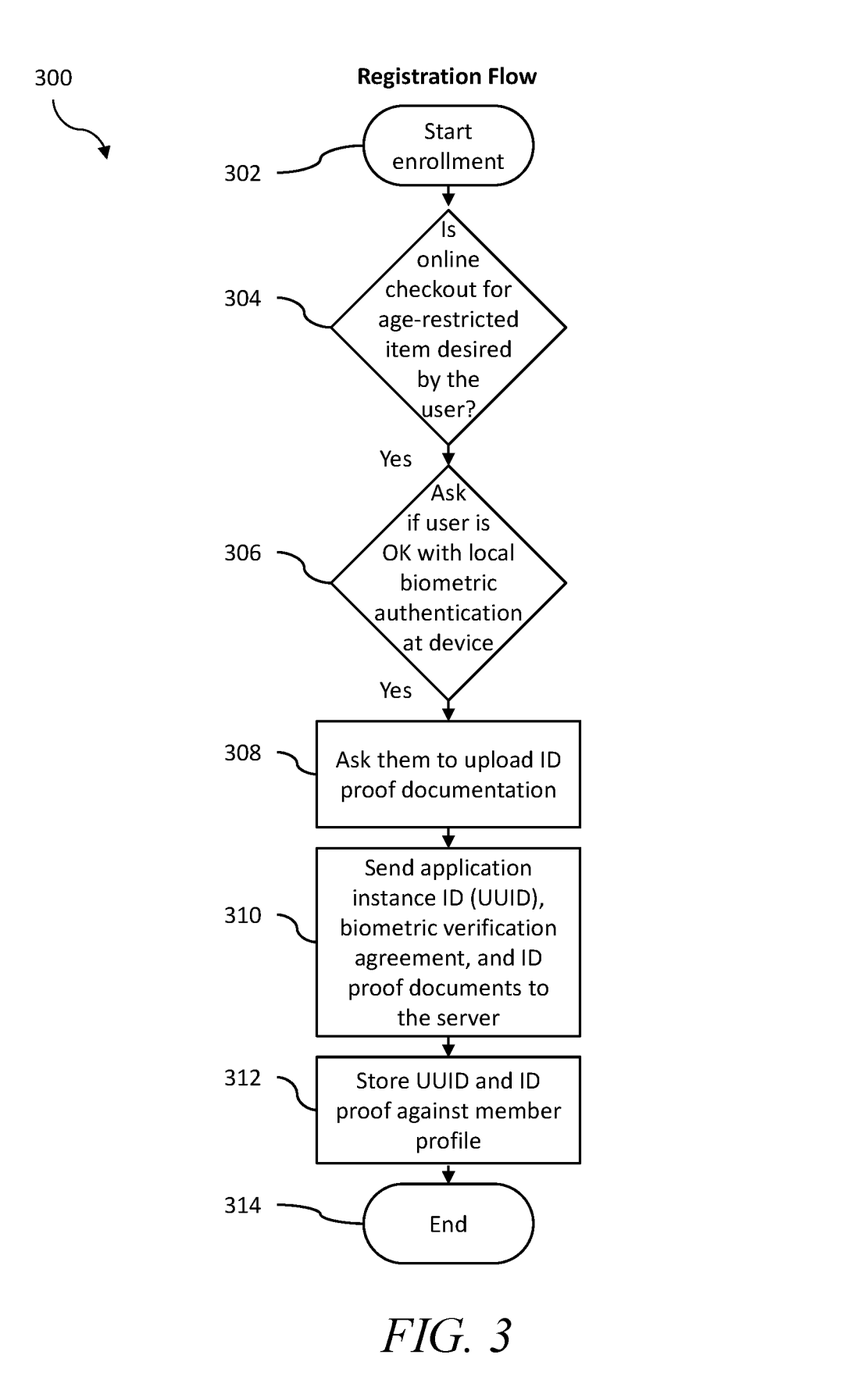
FIG. 3 is a flow diagram in accordance with some embodiments.
Figure 4:
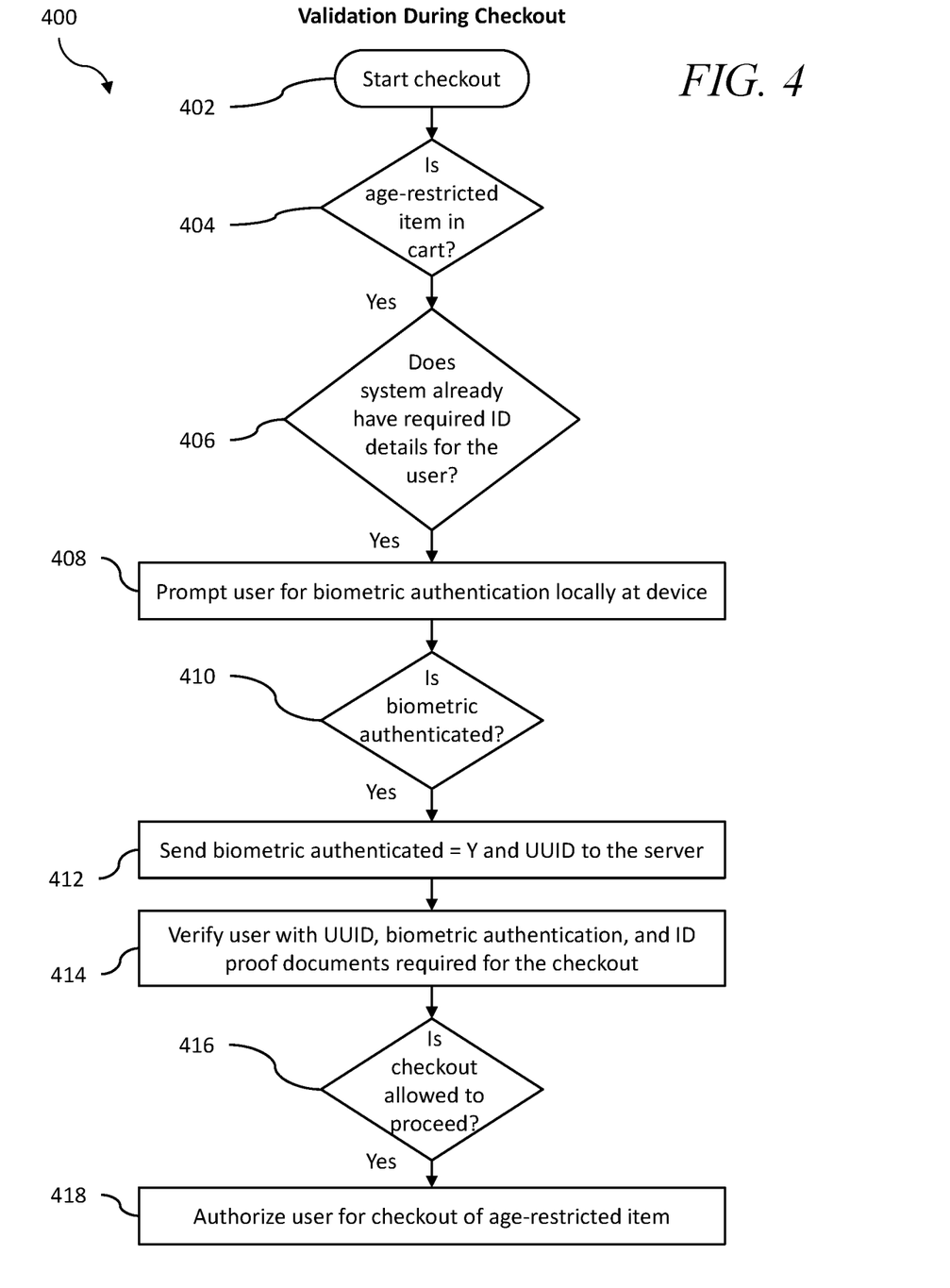
FIG. 4 is a flow diagram in accordance with some embodiments.

Referring to FIGS. 3 and 4, there are shown a registration flow process 300 and a validation flow process 400. In one form, it is contemplated that these two separate flow processes may be used to initially set up a customer for purchases of age-restricted merchandise items and then, once set up or registered, to enable the actual purchases of such items. The flow processes 300 and 400 may use some or all of the components from systems 100 and 200 addressed above.

FIG. 3 shows a registration process 300. At block 302, the customer starts enrollment in the age-restricted merchandise purchase program. It is generally contemplated that this enrollment may be accomplished in various ways. In one form, for example, the customer may enroll in the program as part of generally establishing a customer/member account for online and/or in-store merchandise purchases (not necessarily limited to age-restricted purchases). In another form, the customer may enroll in the program the first time the customer seeks to make the online purchase of an age-restricted merchandise item. Further, in one form, as addressed above, this enrollment may be initiated following download of an app to the customer device to facilitate online purchases.

At block 304, the customer/user is queried regarding whether online checkout for age-restricted items is desired by the customer. Some examples of age-restricted items that may be desired by customers include, without limitation: high value merchandise, movies, video games, aerosol paint, lottery tickets, tobacco products, alcohol products, blades, etc. It is generally contemplated that the customer is queried on the customer's device, which may include, as addressed above and without limitation: smartphones, laptops, tablets, desktop computers, or other computing devices equipped for wireless communication. If the customer's response to the query is yes, the process 300 advances to block 306.

At block 306, the customer is queried if local biometric authentication may be performed at the customer device. This question gives the customer the opportunity to opt into the age-restricted purchase program. As part of this query, the customer may also be asked regarding the capabilities of the customer device, such as confirming whether it is capable of biometric authentication and optionally which form of biometric authentication. As addressed above, biometric authentication may include, without limitation, fingerprint authentication, iris scan authentication, facial recognition, voice authentication, palm vein recognition, or authentication based on other physical characteristics of the customer. If the customer's response to the query is yes, the process 300 advances to block 308.

At block 308, the customer is asked to upload documentation proving the customer's identification, including the age of the customer. For example, the customer's age may be calculated based on a birth date included in the documentation. At block 310, once the documentation is uploaded, the following materials are transmitted to a server: the identification documentation; the customer's "opt in" agreement to participate in the age-restricted purchase program; and the unique identifier addressed above. In one form, it is contemplated that the customer has downloaded an app for online purchases and that the app will generate and/or be associated with a unique identifier (such as a UUID). At block 312, the identification documentation and the unique identifier are stored in a customer/member record in a customer/membership database. It is generally contemplated the customer/member record may be either an existing record or may be created at the time the materials are transmitted to the server. At block 314, the registration process 300 is completed.

FIG. 4 shows a validation process 400. At this stage, it is generally contemplated that the customer has completed the online selection of merchandise items to be purchased and is now proceeding to checkout, i.e., completion of the purchase (including payment). At block 402, the customer starts the checkout. At block 404, it is determined whether an age-restricted item is in the customer's cart, i.e., whether one of the merchandise items selected for purchase is an age-restricted item. If it is determined that one or more of the merchandise items in the cart is an age-restricted item, the process 400 advances to block 406.

At block 406, it is determined whether the customer has already enrolled in the age-restricted merchandise purchase program. In other words, the customer's record in the customer database is examined to determine if the customer has opted into the age-restricted merchandise purchase program and has provided the necessary identification documentation. If the customer has not yet enrolled in the program, the customer may be asked whether he or she would like to register and participate, and the overall process may proceed to the registration process 300 described above and shown in FIG. 3. If the customer has already enrolled in the program, the validation process 400 advances to block 408.

At block 408, the customer is prompted to perform biometric authentication locally. In this particular example, it is contemplated that the customer performs biometric authentication locally at the time of purchase using a smartphone that is equipped to input a biometric reading, such as a fingerprint or facial recognition. At block 410, it is determined whether the biometric authentication was successful. If authentication was not successful (no biometric reading was inputted or the inputted biometric reading did not match the reference biometric reading), the age-restricted purchase transaction is not completed. If authentication is successful (the inputted biometric reading matches the reference biometric reading), the process 400 advances to block 412.

At block 412, the customer device transmits that the authentication was successful and the unique identifier (a UUID in this particular example) to the server. The unique identifier that is transmitted corresponds to the one that was previously generated and/or transmitted during the registration process 300. At block 414, the customer is verified based on the indication that the authentication was successful, the match of the transmitted unique identifier with the one in the customer/member record, and the identification documentation. The customer/member record is examined confirm that the identification documentation shows that the age of the customer/member meets or exceeds the minimum age required for each of the age-restricted merchandise items in the cart.

At block 416, a determination is made as to whether the customer may proceed with checkout, i.e., with purchase of the age-restricted item(s). In other words, the following requirements are confirmed: the customer device shows that local biometric authentication was successfully performed; the customer device transmits a unique identifier that matches one that is stored in the customer/member record; and the identification documentation in the customer/member records shows that the age of the customer/member satisfies the minimum required age for the age-restricted merchandise items in the cart. At block 418, if these requirements are all satisfied, the customer is allowed to proceed with checkout and the purchase transaction is authorized.

Figure 5:
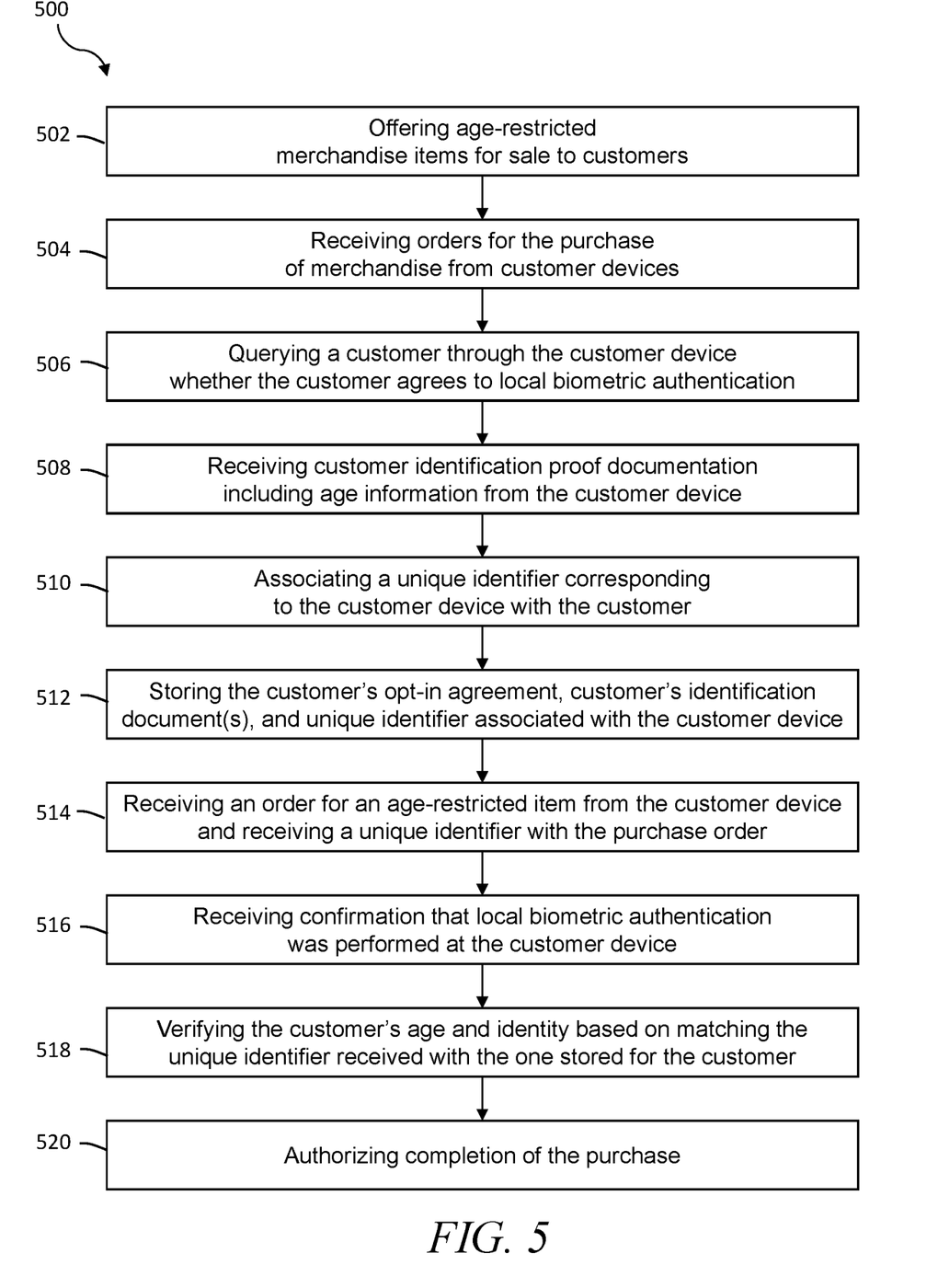
FIG. 5 is a flow diagram in accordance with some embodiments.

Referring to FIG. 5, there is shown a process 500 for the sale of age-restricted merchandise without requiring the transmission of biometric information. In the process 500, biometric authentication is performed locally at a customer device. The process 500 includes some of the steps from the registration process 300 and validation process 400 addressed above. The process 500 may also incorporate some of the components described above in systems 100 and 200.

At block 502, age-restricted merchandise items are offered for sale to customers. Any of various types of age-restricted merchandise items may be offered for sale, and examples have been described in this disclosure. These age-restricted merchandise items are offered for sale online (possibly in addition to being offered for sale at stores). As shown at block 504, orders are received for the purchase of merchandise from customer devices. As described above, customer devices generally include, without limitation, smartphones, laptops, tablets, desktop computers, or other computing devices that may communicate wirelessly with a server.

At blocks 506-512, it is generally contemplated that a customer has expressed some interest in making an online purchase of an age-restricted item, and steps are taken to register the customer in the purchase program. At block 506, the customer is queried through his or her device whether the customer agrees to local biometric authentication in order to perform an online purchase of an age-restricted item. In other words, the customer is given the opportunity to opt into the purchase program. At block 508, customer identification proof documentation, including age information, is received from the customer device. If the customer is interested in participating in the purchase program, the customer will transmit identification documentation for receipt at the server.

At block 510, a unique identifier (which may be a UUID) corresponding to the customer device is associated with the customer. In one form, as described above, a purchase app may be downloaded to the customer device, and this purchase app may generate and/or be associated with the unique identifier (which is, in turn, associated with the customer and the customer's device). At block 512, the customer's opt-in agreement, the customer's identification document(s), and the unique identifier associated with the customer device are all stored in the customer's record in a customer database.

At blocks 514-520, it is generally contemplated that the customer is engaged in online shopping and is proceeding with the purchase of an age-restricted item. At block 514, an order is received for the purchase of an age-restricted item from a customer device, and a unique identifier is received with the purchase order. In other words, the customer has initiated a purchase transaction, and if the customer was previously registered, the unique identifier is also transmitted as part of the transaction. At block 516, confirmation is received that local biometric authentication was performed at the customer device. It is generally contemplated that local biometric authentication was prompted and actually performed prior to transmission of the unique identifier.

At block 518, it is determined whether a unique identifier has been transmitted with the purchase order that matches the unique identifier that was previously stored for that particular customer. If there is a match, the customer's age and identity can be confirmed based on the customer identification materials that were previously stored as part of registration. At block 520, assuming a match, the completion of the purchase is authorized. The customer may then proceed with payment for the merchandise item, and the item may, for example, be shipped for delivery or made available for pick up at a store. It should be understood that the customer may be required to provide identification when the merchandise is actually delivered or when he or she arrives at the store to pick up the item.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for the sale of age-restricted merchandise without transmission of biometric information, the system comprising:
    a plurality of age-restricted merchandise items offered for sale to customers, the age-restricted merchandise items each being restricted from purchase by individuals below a predetermined minimum age;
    a server configured to receive orders for the purchase of merchandise items from customer devices;
    a customer database containing a plurality of customer records;
    a merchandise purchase application to facilitate purchase of merchandise items, the merchandise purchase application configured to be executed locally at a customer device;
    a control circuit communicatively coupled to the merchandise purchase application, the server, and the customer database, the control circuit configured to:
        receive customer identification proof documentation including age information from the customer device;
        associate a unique identifier corresponding to the customer device with the customer;
        store in the customer database a customer's agreement to permit local biometric authentication to enable the purchase of age-restricted merchandise items, the customer's identification proof documentation, and the unique identifier associated with the customer device;
        receive an online order for the purchase of one or more merchandise items from the customer device and receive the unique identifier corresponding to the customer device transmitting the purchase order;
        determine that at least one of the one or more merchandise items in the online order is an age-restricted merchandise item requiring a predetermined minimum age for purchase;
        receive confirmation that local biometric authentication was performed at the customer device transmitting the purchase order, the local biometric authentication being performed without transmission of biometric information between the customer device and the server, without calculation of an identity verification score based on non-biometric considerations, the server being remote from the customer device;
        verify the customer's identity and the local biometric authentication by matching the unique identifier received with the purchase order with the unique identifier for the customer device stored in the customer database;
        verify the customer's age based on the customer's identification proof documentation meeting or exceeding the predetermined minimum age required for the age-restricted merchandise item; and
        authorize completion of the purchase of the age-restricted merchandise item by the customer based on receipt of confirmation that local biometric authentication was performed at the customer device and based on matching the unique identifier received with the unique identifier stored in the customer database.

2. The system of claim 1, wherein the unique identifier is a universally unique identifier (UUID) comprising a 128-bit number.

3. The system of claim 1, wherein the customer device is a smartphone and the local biometric authentication is performed entirely at the smartphone.

4. The system of claim 3, wherein the biometric authentication performed locally at the smartphone is fingerprint authentication, iris scan authentication, facial recognition, voice authentication, or palm vein recognition.

5. The system of claim 4, wherein the merchandise purchase application is configured to be downloaded to the smartphone.

6. The system of claim 5, wherein the unique identifier is associated with the smartphone and accessible to the merchandise purchase application after download of the application to the smartphone.

7. The system of claim 6, wherein the application is configured to prompt the customer for biometric verification when the customer logs onto the application.

8. The system of claim 1, wherein the control circuit is further configured to:
    store the customer's address in the customer's record in the customer database; and
    transmit instructions for a delivery service to deliver the age-restricted merchandise item ordered by the customer to the customer's address.

9. The system of claim 1, wherein the control circuit is further configured to:
    instruct a shopping facility to make the age-restricted merchandise item available for pick up by the customer.

10. A method for the sale of age-restricted merchandise without transmission of biometric information, the method comprising:
    providing a plurality of age-restricted merchandise items offered for sale to customers, the age-restricted merchandise items each being restricted from purchase by individuals below a predetermined minimum age;

receiving orders for the purchase of merchandise items from customer devices and associating a unique identifier with each customer device;

storing a plurality of customer records in a customer database;

providing a merchandise purchase application to facilitate purchase of merchandise items, the merchandise purchase application configured to be executed locally at a customer device;

by a control circuit:

receiving customer identification proof documentation including age information from the customer device;

associating a unique identifier corresponding to the customer device with the customer;

storing in the customer database a customer's agreement to permit local biometric authentication to enable the purchase of age-restricted merchandise items, the customer's identification proof documentation, and the unique identifier associated with the customer device;

receiving an online order for the purchase of one or more merchandise items from the customer device and receiving the unique identifier corresponding to the customer device transmitting the purchase order;

determining that at least one of the one or more merchandise items in the online order is an age-restricted merchandise item requiring a predetermined minimum age for purchase;

receiving confirmation that local biometric authentication was performed at the customer device transmitting the purchase order, the local biometric authentication being performed without transmission of biometric information between the customer device and the server, without calculation of an identity verification score based on non-biometric considerations, the server being remote from the customer device;

verifying the customer's identity and the local biometric authentication by matching the unique identifier received with the purchase order with the unique identifier for the customer device stored in the customer database;

verifying the customer's age based on the customer's identification proof documentation meets or exceeds the predetermined minimum age required for the age-restricted merchandise item; and authorizing completion of the purchase of the age-restricted merchandise item by the customer based on receipt of confirmation that local biometric authentication was performed at the customer device and based on matching the unique identifier received with the unique identifier stored in the customer database.

11. The method of claim 10, wherein the unique identifier is a universally unique identifier (UUID) comprising a 128-bit number.

12. The method of claim 10, wherein the customer device is a smartphone and the local biometric authentication is performed entirely at the smartphone.

13. The method of claim 12, wherein the biometric authentication performed locally at the smartphone is fingerprint authentication, iris scan authentication, facial recognition, voice authentication, or palm vein recognition.

14. The method of claim 13, further comprising, by the server, downloading the merchandise purchase application to the smartphone.

15. The method of claim 14, wherein the unique identifier is associated with the smartphone and accessible to the merchandise purchase application after download of the application to the smartphone.

16. The method of claim 15, further comprising prompting the customer for biometric verification when the customer logs onto the application.

17. The method of claim 10, further comprising, by the control circuit:

storing the customer's address in the customer's record in the customer database; and transmitting instructions for a delivery service to deliver the age-restricted merchandise item ordered by the customer to the customer's address.

18. The method of claim 10, further comprising, by the control circuit:

instructing a shopping facility to make the age-restricted merchandise item available for pick up by the customer.

19. The method of claim 10, further comprising, by the control circuit:

querying the customer to perform biometric authentication locally at the customer device.

20. The system of claim 1, wherein the control circuit is configured to:

in response to determining that at least one of the one or more merchandise items is an age-restricted merchandise item requiring a predetermined minimum age for purchase, transmit a prompt to the customer device that local biometric authentication be performed at the customer device at that time; and following transmission of the prompt, receive the transmitted unique identifier from the customer device and match it against the stored unique identifier.

21. The system of claim 1, wherein verification of proof of identification or age is also requested at a time of delivery to the customer or pick up by the customer of the age-restricted merchandise item.

22. The system of claim 1, wherein the unique identifier is assigned to the customer device or merchandise purchase application and is not generated or selected by the customer.

23. The system of claim 1, wherein the verification of the customer's age based on the customer's identification proof documentation is determined prior to receipt of the purchase order.

* * * * *